TELEGRAPH ELECTRONIC CONTROL DEVICE

Filed Jan. 26, 1967

3,482,042

TELEGRAPH ELECTRONIC CONTROL DEVICE

Pierre Moch, Sucy-en-Brie, France, assignor to C.I.T.-Compagnie Industrielle des Telecommunications, Paris, France Filed Jan. 26, 1967, Ser. No. 612,024
Claims priority, application France, Jan. 26, 1966, 47,350
Int. Cl. H04l *15/00, 15/34, 25/02*
U.S. Cl. 178—17 6 Claims

ABSTRACT OF THE DISCLOSURE

This specification discloses an electronic control device for telegraphy including a first transistor circuit which follows the modulation of incoming signals, a second transistor circuit connected to said first transistor circuit and associated with a time constant circuit for maintaining said second circuit non-conducting during modulation, a third transistor circuit connected to a relay for control thereof and for maintaining said device in operation for the entire duration of the reception of the modulation, a fourth transistor circuit connected to a capacitor charging circuit and a fifth transistor circuit connected to a discharge circuit for said capacitor.

BACKGROUND OF THE INVENTION

Figure 1:
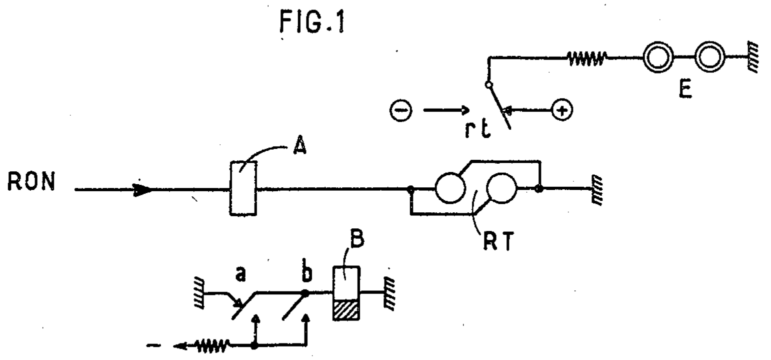

It is known that telegraph modulation is formed by a series of positive or negative "moments." The transmission of a basic information, a character in the case of a Teletype, for example, is carried out by using five "moments," a start signal (always negative), five moments defining the character to be transmitted and one stop signal (always positive). For a transmission speed of five bands each "moment" has a duration of twenty milliseconds except for the stop signal which has a duration of thirty milliseconds. One character is therefore transmitted within one hundred and fifty milliseconds. Each line having one transmission direction transmits a current of twenty milliamps and the direction of this current defines the working and rest states of the circuit. If the direction of the current is the same as that of the transmission, the line is said to be in the "rest state." If the direction of the current is opposite to that of the transmission, the line is said to be in the "working state." In addition to the distinction made between the consecutive states of the modulation, the different operating states of the line must be distinguished. One defines a "positive state" of the line as the situation where two teletype-writers are connected to each end of a line but are not transmitting information. In contrast to this an available line is characterized by a "negative state"; and lastly, an end of transmission signal is formed by the return from the positive to the negative state.

The detection of an end of transmission signal formed by a negative signal having a duration greater than 1500 milliseconds has to led to the construction of a complex circuit capable of differentiating this signal from the modulation of several successive thirty-second combinations; as a matter of fact, in the case of an end of transmission signal, it is necessary to stop the operation of the Teletype; whereas, in the case of modulation, it is necessary to keep the Teletype in operation.

It is known to use two relays, one connected in series with the line and beating in synchronism with the modulation, and the other being excited only upon appearance of a positive signal, said other relay having a "delay ring" prohibiting de-energization when two consecutive signals do not exceed a certain duration *t*. This known device presents the important disadvantage of being subjected to very fast wear and of having a relatively great inertia; such a device therefore would be incapable of satisfactory operation if one substantially increases the modulation speed.

The purpose of the present invention is to provide an electronic device obviating the abovementioned drawbacks.

BRIEF DESCRIPTION OF THE INVENTION

A device according to the present invention, when provided within a teletype-writer receiver of a Telex subscriber has several purposes: First, it serves to watch over the state of the RON line and maintain the Teletype in operation during the moments when modulation exists, this even in the most unfavorable cases, such as, a series of thirty-second combinations with a distortion of 40%. This leads to maintenance of the operation of the teletype for the positive pulses lasting twelve milliseconds separated by negative current durations of 128 milliseconds. Second, it effects disconnection of the Teletype upon appearance on the line RON of a negative signal of a duration of more than 1500 milliseconds or upon accidental disappearance of signals for more than 1500 milliseconds.

In other words, the device according to the invention is in a "rest state" during the presence of a permanent negative signal or upon absence of any polarity on the line RON, and the Teletype is then disconnected. Or else, the device is in a "working state" during the presence of a positive signal on the line RON and the Teletype is then in operation.

In particular the device according to the invention is remarkable by the fact that it comprises a first transistor circuit which follows the modulation of the signals, a second transistor circuit associated with a time-constant circuit for maintaining said second circuit non-conducting during the modulation, and a third transistor circuit for energizing an electromagnetic relay and for maintaining said device in operation for the entire duration of the reception of the modulation.

According to another characteristic of the invention, said first transistor circuit is connected to a capacitor charging circuit and said second transistor circuit is connected to a discharge circuit for said capacitor.

According to another characteristic of the present invention, the device comprises a first transistor series connected with a telegraph relay, a second transistor having its base connected to a delay circuit and a third transistor series connected with an electromagnetic relay for the control thereof.

According to one embodiment, said electronic device comprises five transistors, a plurality of resistors, one condenser and one electromagnetic control relay. When a negative signal is received on the line, four of the transistors are turned off, one transistor is in the conducting state and the electromagnetic relay is in the rest state. When a positive signal is received on the line, the four transistors that were blocked are turned on, the transistor which was in the conducting state is turned off, the capacitor is being charged and the electromagnetic relay is excited.

When telegraph modulation exists, the capacitor is charged while the signals are positive and tends to be discharged while negative signals are received, thus maintaining certain transistors in their conducting state so that the total effect is the same as if all of the signals were positive, thus maintaining the electromagnetic relay in the excited state thereby keeping the teletype writer in operation.

It is an object of the present invention to provide an electronic control device of the type described which eliminates or otherwise substantially avoids the inherent difficulties of known devices of a similar nature.

It is another object of the present invention to provide an electronic control device of the type described which is capable of satisfactory operation at high modulation speeds.

It is a further object of the present invention to provide an electronic control device of the type described which is simple in construction, dependable in operation and economic in manufacture.

Other features and advantages of the device according to the invention will appear from the following detailed description referring to the attached drawing illustrating one of the possible embodiments of the invention.

Figure 2:
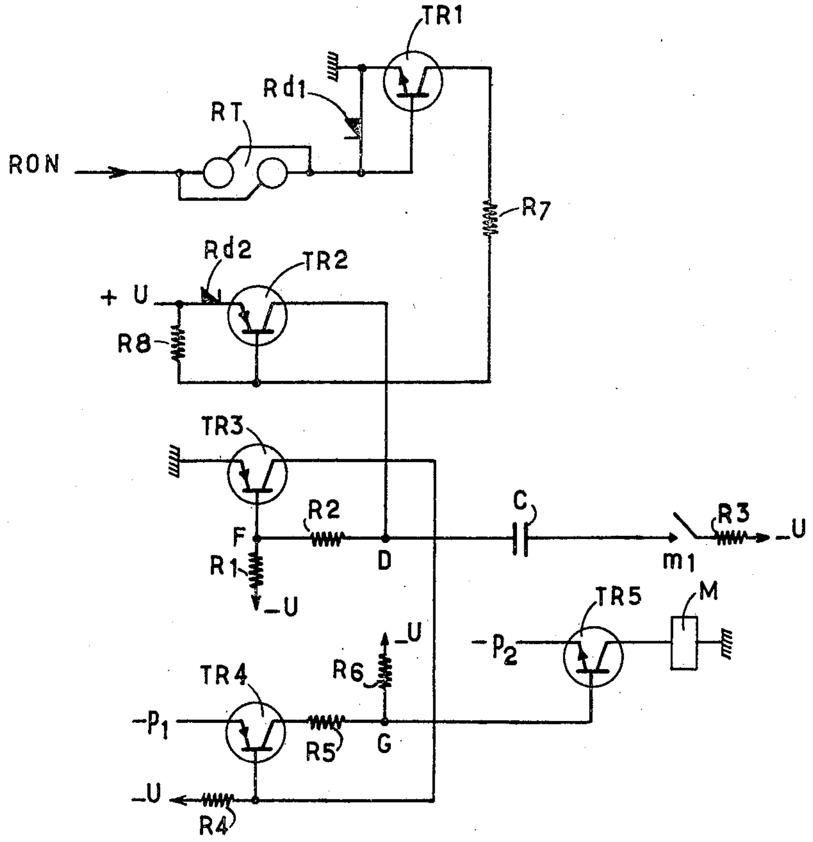

In the drawing:

FIGURE 1 is a schematic representation of a known device and FIGURE 2 is a similar representation of an embodiment of the present invention.

DETAILED DESCRIPTION OF THE INVENTION

In the known circuit illustrated in FIGURE 1, the reception line RON of a teletype-writer comprises a relay A and a telegraphic-type relay RT (schematically illustrated) connected in series. The electromagnet of the Teletype is shown at E; the relay A is of the electromagnetic-polarized-relay-type vibrating under the effect of the modulation substantially in the same way as the telegraph relay. However, in the absence of excitation current, the spring sustaining the armature of relay RT is slightly biased so that the armature rests on an abutment or stop device defining a position corresponding to the passage of the working current. Thus an accidental cutting of the RON line will result in or be equivalent to the passage of a negative signal defining the end of a communication period. The relay B is directly controlled by the contact *"a"* of the relay A and remains closed by its own holding contact *"b."* The relay B remains excited for the duration of the modulation and keeps the teletype-writer excited for the same duration even in the most unfavorable conditions (32*d* successive combinations), that is, when there is an alternating of negative pulses of 128 milliseconds and positive pulses of 12 milliseconds. The relay B ensures a de-excitation delay of more than 500 milliseconds; this delay is obtained by the combination of the "ring effect" with the short-circuiting of the coil of relay B when the relay A is de-energized upon reception of a permanent negative signal on the line RON. The actual de-excitation of the relay B, occurring after the abovementioned delay, results in the opening of one of its contacts thereby disconnecting the teletype-writer.

The FIGURE 2 illustrates a circuit according to the invention substituted for the assembly of relays A and B of FIGURE 1. The circuit of the invention is, as well as the assembly A–B of FIGURE 1, connected in series with the telegraph relay RT.

The embodiment of the invention illustrated in FIGURE 2 comprises five transistors TR1 to TR5, eight resistors R1 to R8, one condenser C, two diodes R*d*1 and R*d*2 and one common type electromagnetic relay M. The start of the teletype-writer and its maintenance in excited state for the duration of the modulation is controlled by the relay M in a way similar to that of the relay B of FIGURE 1.

The line RON is connected through the telegraph relay RT to the base of the transistor TR1 which is of the NPN type; the emitter of transistor TR1 is grounded and also connected to the base of TR1 through the diode RD1 whose negative terminal is connected to the base of TR1; the collector of TR1 is connected to the base of the transistor TR2, which is of the PNP type, through a resistor R7. A positive voltage source +U is connected to the emitter of TR2 through a diode R*d*2 and to the base of TR2 through a resistor R8. A negative voltage source —U is connected to the collector of TR2 through a resistor R3, a working contact *m*1 of the relay M and a capacitor C. The collector of TR2 is also connected to the base of the transistor TR3 of the PNP type through a resistor R2. The emitter of TR3 is grounded, the collector of TR3 being connected to the base of a transistor TR4 of the PNP type. The base of TR3 is connected to the negative voltage source —U through a resistor R1 and the base of TR4 is connected to the same negative voltage source, while the emitter of TR4 is connected to a negative voltage source —P1 and the collector of TR4 is connected to a negative voltage source —U through resistors R5 and R6 in series. The midpoint G between resistors R5 and R6 is connected to the base of a transistor TR5 of the NPN type. The emitter of TR5 is connected to a negative voltage source —P2, the absolute value of which is lower than the negative voltage connected to resistor R6. The collector of TR5 is grounded through the coil of the relay M. This relay M comprises a plurality of contacts other than *m*1 not shown in the figure since the other contacts are irrelevant to the operation of the invention.

The operation of the circuit of FIGURE 2 will now be described in connection with several of the possible working conditions: (a) The circuit is in a rest state defined by the absence of any signal on the line RON or the presence of a negative signal on this line.

The presence of a negative signal on the RON line causes this line to be connected to ground through the telegraph relay RT and the diode R*d*1. The voltage applied to the base of the transistor TR1 is lower than the voltage of its emitter, and TR1 being of the NPN type is turned off. Since there is no signal on the base of transistor TR2, the latter is also turned off. The transistor TR3 being of the PNP type is in the conducting state since its base is negative with respect to its emitter which is grounded. The voltage at F connected to the base of transistor TR3 is slightly negative, it value being not very far from the ground voltage, the transistor TR3 conducts a small current and the base of transistor TR4 is substantially at the voltage of the emitter of TR3, that is, at the ground voltage. The transistor TR4 of the PNP type is turned off since its emitter is at a negative voltage —P1 and its base is substantially at the ground voltage. The base of transistor TR5 (NPN) is at the negative voltage applied to the free end of R6. This negative voltage being more negative than the voltage —P2 applied to the emitter of TR5, the latter is non-conducting and the relay M is not energized. The relay M being not excited, the contact *m*1 is open and no voltage is applied to the right hand side plate of the capacitor C; whereas, the other plate of C is connected to the ground through resistor R2, the base of TR3 being substantially at the ground voltage.

In summary, when the circuit is in the rest state (negative signal on the line RON) the transistors TR1, TR2, TR4 and TR5 are turned off, transistor TR3 is in the conducting state and the relay M is in the rest position.

(b) The circuit is in the working state defined by the existence of a positive signal on the line RON.

If there is a positive polarity signal on the line RON, the direction of the current coincides with the direction of the transmission which defines the working state of the circuit. The base of the transistor TR1 is at a voltage higher than that of the emitter, and so transistor TR1 conducts a current and its collector is substantially at the same voltage as the emitter, that is, the ground voltage. The voltage of the base of TR2, being between the ground voltage and the positive voltage +U is therefore lower than the voltage of the emitter of TR2, thus TR2 is turned on and the point D is brought up to the voltage +U of the emitter of TR2. The base of TR3 (point F) is consequently at a voltage higher than that of its emitter, and TR3, which was previously in the conducting state, is turned off. The base of TR4, being connected at the voltage —U through the resistor R4, is now at a voltage more negative than the voltage —P1 applied to the emitter of TR 4. Transistor TR4 is then turned on, a current flows from —P1 toward —U through resistors R5 and R6, and the voltage at G increases and passes from —U to a value higher than —P2. The transistor TR5 is then turned on and the relay M is energized closing the contact *m*1 which connects one plate of the capacitor C to the voltage —U through the resistor R3, the other plate of the capacitor C being at the voltage of the point D, this voltage being +U since transistor TR2 is in the conducting state.

In summary, the presence of a positive signal on the line RON defines the working state of the circuit where transistors TR1, TR2, TR4, and TR5 are in the conducting state, the transistor TR3 is turned off, the capacitor C is being charged to the voltage U and the relay M is excited.

(c) State of the circuit in the presence of a modulation.

The first moment of the modulation is always of the negative type, the seventh and last is always of the positive type, the other moments being either positive or negative in dependence on the transmitted information. Let us assume that the five intermediary moments are alternately positive and negative.

The relay M is therefore excited upon appearance of a positive pulse on the line RON and by construction of this relay this excitation is slightly delayed and as mentioned above as the capacitor C is charged at the voltage U. When the next negative pulse appears, transistors TR1 and TR2 are turned off (passage to the rest state of the circuit) and the capacitor C discharges through resistors R1, R2 and R3. During the discharge of capacitor C, the voltage at D is kept positive as if TR2 were still conducting. Consequently, transistor TR3 is maintained blocked and the transistors TR4 and TR5 are still conducting. This state is maintained as long as the capacitor is discharging, the duration of the discharge depending upon the time-constant of the RC discharge circuit. In the case of a normal modulation, the most unfavorable situation is that of the transmission of 32*d* combinations 128/12 taking into account 40% of distortion; the minimum duration of the discharge of the capacitor C should therefore be greater than 128 milliseconds. During the modulation the relay M, in the excited state, the circuit must maintain the teletype-writer in operation. During the modulation period the transistors TR1 and TR2 are conducting as long as the line RON has a positive polarity and are turned off when negative signals are applied on this line.

The function of the contact *m*1 is to control the charge and the discharge of the capacitor C only at the time when the relay M is in the excited state.

A negative signal on the RON line having a duration greater than 1500 milliseconds must be considered as the end of transmission signal and the relay M must stop the operation of the teletype-writer. The same is true if absence of a polarity signal on the line RON lasts for more than 1500 milliseconds. If one of these cases occurs, transistors TR1 and TR2 are turned off and the capacitor C is completely discharged. During the discharge of the capacitor, the transistor TR3 is maintained off for a certain time, and consequently transistors TR4 and TR5 are maintained in the conducting state and the relay M excited. Then the transistor TR3 is turned on, transistors TR4 and TR5 are turned off, the relay M is no longer excited and the teletype-writer is disconnected.

For satisfying simultaneously the necessary conditions, that is, for having the relay M excited during the modulation and de-energized only 1500 milliseconds after the appearance of a negative signal on the line RON the duration of the non-conducting state of TR3 (when TR4 and TR5 are also in the non-conducting state) should be determined by the time-constant of the discharge circuit of the capacitor C.

It is obvious that other combinations of PNP and NPN transistors can be provided from the above description without departing from the scope of the present invention. In particular it is possible to change the type of the transistors used in the circuit of the invention, the change being accompanied by a suitble change of the polarity of the bias voltage sources connected thereto.

The present invention is in no way limited to the particular circuit described and illustrated in the present specification and drawings only as a particular embodiment of the invention.

I claim:

1. An electronic control device for controlling the operating state of a telegraph signal transducing apparatus, connected to a telegraph reception line, in dependence on the characteristics of said signals comprising relay means for controlling the operation of said apparatus connected to said reception line through a circuit including the series connection of a first transistor circuit biased for conduction in response to reception on said line of a positive polarity signal and for non-conduction in response to reception on said line of negative polarity and zero value signals, a second transistor circuit biased for non-conduction in response to reception on said line of a positive polarity signal, biased for non-conduction in response to reception on said line of a negative polarity and a signal of zero value having a duration less than a threshold duration and biased for conduction in response to reception on said line of a negative polarity and a signal equal to zero value having a duration greater than said threshold duration, and a third transistor circuit biased for conduction in response to reception on said line of a negative polarity signal having a duration greater than said threshold duration.

2. An electronic control device according to claim 1, wherein said first transistor circuit comprises two series-connected transistors of respectively NPN and PNP type.

3. An electronic control device according to claim 1, further including a capacitive discharge circuit and wherein said second transistor circuit comprises a transistor having a base connected to said capacitive discharge circuit, the discharge of the last mentioned circuit delaying the passage from the non-conducting to the conducting state of said second transistor circuit for said threshold duration.

4. An electronic control device according to claim 1, wherein said third transistor circuit comprises two series-connected transistors of respectively NPN and PNP type.

5. An electronic control device according to claim 3, wherein said capacitive discharge circuit comprises a resistor, a capacitor and a contact of said relay means connected in series, the free end of said resistor being connected to the output of said first transistor circuit, the capacitor being charged through said first circuit when the latter is in the conducting state and discharged through a resistor when said first circuit is in the non-conducting state.

6. An electronic control device according to claim 1, wherein said first transistor circuit comprises first and a second transistors of respectively NPN and PNP type, the emitter of the first transistor being connected to ground and to the base through a diode, the base of the first transistor being further connected to the output of the transmission line, the collector of said first transistor being connected to the base of said second transistor, the emitter of said second transistor being connected to a positive voltage source through a diode, said second circuit comprising a third transistor of the PNP type having its base connected to the collector of said second transistor, to a first negative voltage source through a resistor and to one plate of a condenser, the other plate of which is connected to said first negative voltage source through a resistor and a contact of said relay means, the emitter of said third transistor being grounded, said third circuit comprising a fourth transistor, of the PNP type, having its base connected to the collector of said third transistor and to said first negative voltage source through a resistor, said fourth transistor having its emitter connected to a second negative voltage source and its collector connected to the base of a fifth transistor of the NPN type, the emitter of which is connected to a third negative voltage source and the collector of which is connected to a control winding of said relay means.

References Cited

UNITED STATES PATENTS 2,332,142 10/1943 Hajos.

OTHER REFERENCES

G. E. Transistor Manual, 6th Edition, Copyright 1962.

THOMAS A. ROBINSON, Primary Examiner

M. M. CURTIS, Assistant Examiner

U.S. Cl. X.R.

178—4.1, 69